Patented May 18, 1948

2,441,773

UNITED STATES PATENT OFFICE 2,441,773

STABILIZED DINITROETHANE AND PROCESS

Charles William Scaife, Norton-on-Tees, England, assignor to Imperial Chemical Industries Limited, a corporation of Great Britain No Drawing. Application June 4, 1945, Serial No. 597,601. In Great Britain May 19, 1944

7 Claims. (Cl. 260—644)

This invention relates to 1,2-dinitroethane compositions.

1,2-dinitroethane has been proposed for use as a reagent for syntheses and as an explosive but suffers from the defect that it tends to decompose through time. It can be rendered more stable by distillation but this is troublesome to carry out. It is an object of the present invention to provide dinitroethane compositions which possess improved stability in storage. It is a further object to provide a novel method for producing 1,2-dinitroethane compositions which have improved stability.

According to the invention there is provided a 1,2-dinitroethane composition of improved stability comprising a mixture of 1,2-dinitroethane and as stabilizer therefor an organic acidic substance, which is preferably an aromatic sulphonic acid. Preferably the stabilizer is in intimate admixture with the dinitroethane. Suitable stabilizers are: benzene sulphonic acid, p-toluene sulphonic acid, naphthalene 2-sulphonic acid, naphthalene 1,5-disulphonic acid, naphthalene 2,7-disulphonic acid, anthraquinone 1,5-disulphonic acid, anthraquinone 1,8-disulphonic acid or mixtures of these. Of these the naphthalene disulphonic acids and the anthraquinone disulphonic acids are preferred.

The acidic substance is preferably introduced into the molten 1,2-dinitroethane and may be used, for example, in a proportion of 0.1–2% by weight, calculated on the weight of the mixture. It is preferred to use not less than 0.5% of stabilizer. To obtain best results it is necessary to first purify the 1,2-dinitroethane by crystallization. It is also desirable that the 1,2-dinitroethane be substantially dry.

Further improvement in stability may be obtained by subjecting the 1,2-dinitroethane to various preliminary treatments to remove the substances causing instability, e. g. distillation under reduced pressure or treatment under a vacuum, e. g. of less than 20 mms. of mercury. Very good results are obtained by the last mentioned treatment, which has the advantage that it is simple and easily effected. According to a further feature of the invention we therefore produce stable 1,2-dinitroethane compositions by subjecting molten 1,2-dinitroethane to vacuum treatment and incorporating the acidic substance. According to another preferred feature also the 1,2-dinitroethane is melted, the acidic substance is added and the mixture is subjected to vacuum at a temperature above the melting point and below that at which the 1,2-dinitroethane has an appreciable vapour pressure, for example, a vacuum of 2–20 mm. and a temperature of 40–80° C. This treatment is preferably carried out in the presence of an inert gas, for example carbon dioxide, using a gas leak.

Distillation or vacuum treatment without addition of an acidic substance renders the 1,2-dinitroethane initially stable, but compositions treated in this way do not retain their stability over lengthy periods. Addition of the acidic substance alone confers better initial stability than either of these treatments but this improvement is not retained over long periods. The addition of the acidic substance in composition with the preliminary treatment confers the great advantage of stability in storage over long periods.

Good results are obtained using 0.5% by weight of naphthalene 1,5-disulphonic acid or of anthraquinone 1,5-disulphonic acid.

When 1,2-dinitroethane is used in a mixture it is preferably treated with the stabilizer before mixing it with the other components.

The benefits of the invention are brought out by the following results which were obtained in a stability test to be now described. According to this test a standard weight of the substance under examination is placed in a standard "Pyrex" bulb, the latter is connected to a manometer, the system is evacuated at 5 mms. of mercury and is sealed, and the bulb is then immersed in a water bath at 100° C. The change in pressure is noted at regular time intervals and from it the amount of gas evolved per gramme of substance is calculated at N. T. P. The relative stabilities of different 1,2-dinitroethane compositions are assessed by comparing the volumes of gas evolved in a given time.

| Sample | Time of storage, months | Mls. of gas evolved per gm. of sample after the following times: | |
|---|---|---|---|
| | | 4 hours | 30 hours |
| Recrystallized | Nil | 1.0 | (1) |
| | 1 | 3.1 | (2) |
| Recrystallized and evacuated at 60° C. for 1 hour at 1 mm | Nil | 0.095 | 1.63 |
| | 1 | 0.265 | (3) |
| Recrystallized +1.0% of naphthalene 1,5-disulphonic acid | Nil | 0.070 | 1.04 |
| | 1 | 0.082 | 1.31 |
| Recrystallized, 0.5% naphthalene 1,5-disulphonic acid added and evacuated at 80° C. for 1 hr. at 2 mm | 2 | 0.089 | 1.55 |
| | Nil | 0.094 | 1.40 |
| | 1 | 0.088 | 1.32 |
| | 2 | 0.076 | 1.17 |
| | 5 | 0.083 | 1.40 |
| | 7 | 0.086 | 1.36 |
| Recrystallized, 0.5% anthraquinone disulphonic acid added and evacuated at 50° C. for 1 hr. at 1 mm | Nil | 0.023 | 0.475 |
| | 1 | 0.026 | 0.475 |
| | 3 | 0.029 | 0.514 |

1 Rapid decomposition at 6 hours.
2 Complete decomposition at 6 hours.
3 Decomposed at 30 hours.

It has been mentioned that it is preferred to introduce the acidic substance into the molten 1,2-dinitroethane. It may alternatively, although not with such satisfactory results, be introduced into the solution of the 1,2-dinitroethane from which the latter is crystallized. When this procedure is followed a solvent which is also a solvent for the acidic substance should be employed. Suitable solvents are for example, methyl and ethyl alcohols.

The invention is illustrated but not limited by the following examples:

Example 1

1,2-dinitroethane was recrystallized four times from methanol and freed from methanol and water by standing for 24 hours in a vacuum desiccator over calcium chloride and for 24 hours in a vacuum desiccator over phosphorus pentoxide. It was then melted; 1% of its weight of pure, dry naphthalene 1,5-disulphonic acid was added and the mixture was stirred for 1 hour at 50°–60° C. The mixture was then allowed to solidify and was stored in a "Pyrex" glass vessel.

Example 2

1,2-dinitroethane was recrystallized four times from methanol, allowed to stand in a vacuum desiccator over calcium chloride for 24 hours and then in a vacuum desiccator over phosphorus pentoxide for 24 hours. The 1,2-dinitroethane was melted, 0.5% of its weight of naphthalene 1,5-disulphonic acid was added and the mixture was then subjected for 1 hour to vacuum treatment at a pressure of about 2 mms. and at a temperature of 80° C. to remove volatile impurities. The treatment was carried out in the presence of carbon dioxide using a gas leak and the mixture was agitated to keep the naphthalene disulphonic acid dispersed in the 1,2-dinitroethane. The molten mixture was poured into a "Pyrex" glass storage vessel and allowed to solidify.

I claim:

1. A process for improving the resistance of 1,2-dinitroethane compositions to decomposition upon aging which comprises subjecting dinitroethane to vacuum treatment with the application of heat and thereafter incorporating therein while in the molten condition an aromatic sulphonic acid.

2. A process for improving the resistance of 1,2-dinitroethane to decomposition upon aging which comprises melting dinitroethane, incorporating therein while in the molten condition an aromatic sulphonic acid and thereafter subjecting to vacuum treatment.

3. A process for improving the resistance of 1,2-dinitroethane to decomposition upon aging which comprises melting dinitroethane, incorporating therein while in the molten condition an aromatic sulphonic acid and thereafter subjecting the mixture to a vacuum of less than 20 mms. at a temperature of from about 40° to 80° C.

4. 1,2-dinitroethane compositions of improved resistance to decomposition upon aging consisting of vacuum treated 1,2-dinitroethane and as a stabilizer therefor an aromatic sulphonic acid.

5. 1,2-dinitroethane compositions of improved resistance to decomposition upon aging consisting of vacuum treated 1,2-dinitroethane and as a stabilizer therefor naphthalene 1,5-disulphonic acid.

6. 1,2-dinitroethane compositions of improved resistance to decomposition upon aging consisting of vacuum treated 1,2-dinitroethane and as a stabilizer therefor anthraquinone 1,5-disulphonic acid.

7. A process for improving the resistance of 1,2-dinitroethane compositions to decomposition upon aging which comprises subjecting dinitroethane to vacuum treatment with the application of heat and incorporating therein while in the molten condition an aromatic sulphonic acid, the order of the treatment steps being immaterial.

CHARLES WILLIAM SCAIFE.

REFERENCES CITED

The following references are of record in the file of this patent:

UNITED STATES PATENTS

| Number | Name | Date |
| --- | --- | --- |
| 2,247,255 | Senkus | June 24, 1941 |